United States Patent [19]
Mazak

[11] Patent Number: 6,059,664
[45] Date of Patent: May 9, 2000

[54] DRIVE ELEMENT

[75] Inventor: George Mazak, Dianella, Australia

[73] Assignee: Faircrest Holdings Pty Ltd., Australia

[21] Appl. No.: 08/982,703

[22] Filed: Dec. 2, 1997

[30] Foreign Application Priority Data

Sep. 24, 1997 [AU] Australia ................. 39219/97

[51] Int. Cl.[7] .................................................. F16C 1/04
[52] U.S. Cl. .................. 464/148; 464/53; 464/149; 464/173
[58] Field of Search ............... 464/53, 148, 149, 464/153, 154, 157, 158, 173, 179

[56] References Cited

U.S. PATENT DOCUMENTS

| | | | |
|---|---|---|---|
| 670,748 | 3/1901 | Weddeler | 464/149 |
| 815,726 | 3/1906 | Mehlig | 464/179 |
| 1,036,144 | 8/1912 | Plank | 464/148 |
| 1,100,097 | 6/1914 | Reed | 464/158 |
| 1,677,337 | 7/1928 | Grove . | |
| 1,710,237 | 4/1929 | Ohlson | 464/53 |
| 1,866,714 | 7/1932 | King | 464/173 |
| 2,491,820 | 12/1949 | Leibing et al. | 464/53 |
| 2,684,581 | 7/1954 | Zublin | 464/149 |
| 2,712,739 | 7/1955 | Dempster | 464/153 |
| 3,304,878 | 2/1967 | Sabre | 464/173 |

FOREIGN PATENT DOCUMENTS

| 19017 | 5/1901 | United Kingdom | 464/149 |
|---|---|---|---|
| 2220729 | 7/1989 | United Kingdom . | |

OTHER PUBLICATIONS

English language translation of French patent application 7522761. Jul. 1975.

English language abstract of Soviet Union patent 827,868. Jul. 1978.

*Primary Examiner*—Lynne H. Browne
*Assistant Examiner*—Greg Binda
*Attorney, Agent, or Firm*—Michael Best & Friedrich LLP

[57] ABSTRACT

A drive element (10) is provided for coupling together rotatable shafts (12) and (14). The shafts (12) and (14) are able to rotate about their respective longitudinal axes (12A) and (14A). Additionally, the shafts (12) and (14) can pivot relative to each other about a pivot point P which is coincident with the geometric center of the drive element (10). Drive element (10) includes a groove (20) for receiving a tongue (16) of shaft (12); and, a tongue (22) which is seated in a groove (18) formed in shaft (14). Surface (26) of the groove (20) and surfaces (34) on opposite sides of the tongue (22) are shaped so that as the axes of rotation (12A) and (14A) of the shafts (12) and (14) are pivoted relative to each other through a predetermined range of angles the respective loci of closest contact between the shafts (12) and (14) and the pivot point P remains constant. Accordingly the total length of a universal coupling drive (24) composed of the shaft (12) element (10) and shaft (14) remains constant for that predetermined range of pivoting of the shafts (12) and (14).

27 Claims, 4 Drawing Sheets

DRIVE ELEMENT

BACKGROUND OF THE INVENTION

The present invention relates to an improved drive element for transmitting or transferring torque between two rotatable members.

SUMMARY OF THE INVENTION

Applicant's International application No. PCT/AU96/00193 describes a drive element and an articulated drive incorporating one or more of the drive elements for transmitting torque in both clockwise and anticlockwise directions and along straight and curved paths. In order to transmit torque around a bent or curved path, two or more drive elements are intermeshed and held within a supporting structure such as a tube. Articulated drives for transmitting torque in opposite directions along a curved path have been successfully constructed in this manner. However it has been recognised that the degree of curvature achievable is limited by the effect that the distance between two drive elements varies as degree or radius of curvature of the path along which the elements lie changes. Indeed, this ultimately limits the degree of curvature available for a specific articulated drive and increases the complexity of flexible articulated drives where additional mechanisms are required to compensate for the change in distance between adjacent drive elements with changing radius of curvature.

It is an object of the present invention to provide an improved drive element with enhanced characteristics over that described in Applicant's earlier application.

According to one embodiment of the present invention there is provided a drive element for coupling together first and second rotatable members having respective axes of rotation which can pivot relative to each other about a pivot point located at the geometric centre of the drive element, the drive element having first and second coupling means for coupling with the first and second rotatable members respectively, and configured to maintain a substantially constant spacing between the pivot point and respective loci of closest contact of the first and second members with the geometric centre of the drive member for a predetermined range of angles of pivot of said axes relative to each other.

Preferably the predetermined range of angles is in the order of up to 50° to 60°.

Preferably the first coupling means is in the form of one of a projection and a slot for engaging with a slot or a projection formed on the first rotatable member, as the case may be, and wherein the surface of the coupling means adjacent the root of the projection or slot is relieved from the midpoint of the projection or slot in opposite directions along the length of the projection or slot to define a bearing surface a length of which is shaped or profiled to correspond to the locus of closest contact of the first member and first coupling means.

Preferably the second coupling means is in the form of one of a projection and a slot for engaging with a slot or a projection formed on the second rotatable member, as the case may be, and wherein the surface of the second coupling means adjacent the root of the projection or slot is relieved from the midpoint of the projection or slot in opposite directions along the length of the projection or slot to produce a bearing surface a length of which is shaped or profiled to correspond to the locus of closest contact of the second member and the second coupling means.

Preferably the first and second coupling means extend in mutually perpendicular directions.

Preferably the first coupling means is formed as one of the projection and slot, and the second coupling means is formed as the other of the projection and slot. Although, in other embodiments, both the first coupling means and second coupling means can be in the same form, ie. both either a projection or both a slot.

Preferably the drive element is in the form of a sphere with material removed therefrom to produce said first and second coupling means.

According to another aspect of the present invention there is provided an articulated coupling comprising:

first and second rotatable shafts rotatable about their respective longitudinal axes; and, a drive element located between and coupled to the first and second rotatable shafts for transmitting torque from one of the shafts to the other shaft in a clockwise or anticlockwise direction, the drive element provided with first and second coupling means for coupling with the first and second rotatable shafts respectively, the first and second coupling means adapted to allow the respective longitudinal axes of the rotatable members to pivot relative to each other about a pivot point coincident with the geometric centre of the drive element, the drive element further configured so as to maintain a substantially constant distance between the pivot point and the respective loci of closest contact of the first and second rotatable shafts with the geometric centre of drive element for a predetermined range of angles of pivot of the axes relative to each other so that the total length of the articulated coupling remains substantially constant over the predetermined range of angles of pivot of the axes relative to each other.

According to another aspect of the present invention there is provided an articulated flexible drive for transmitting torque along a drive line in both clockwise and anticlockwise directions, said articulated flexible drive comprising a plurality of drive elements and a flexible housing for rotatably retaining the drive elements along the drive line, the drive elements being rotatable about respective rotation axes tangent to the drive line and each having first and second coupling means to facilitate intermeshing of adjacent elements in the manner so that adjacent drive elements can slide relative to each other in planes containing the first and second coupling means of adjacent intermeshing drive elements, the first and second coupling means further configured so as to maintain substantially constant spacing between the geometric centres of adjacent drive elements for a locus of closest contact of the adjacent drive elements for a predetermined range of angles of pivot of the respective axes of rotation relative to each other.

DESCRIPTION OF THE DRAWINGS

Embodiments of the present invention will now be described by way of example only with reference to the accompanying drawings in which.

DESCRIPTION OF THE PREFERRED EMBODIMENT

Figures 1, 3:
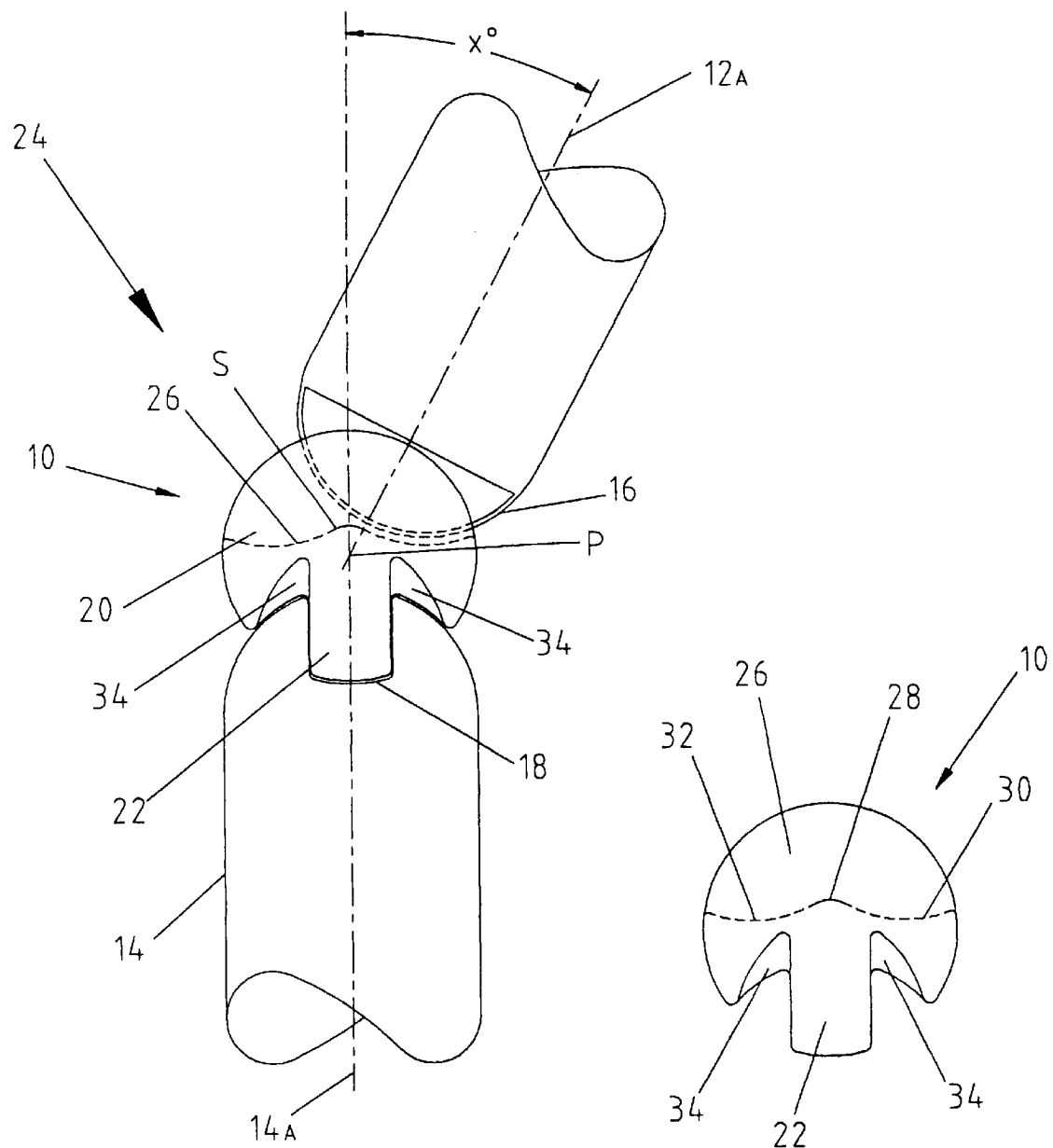
FIG. 1 is a side view of a universal coupling incorporating a drive element in accordance with the present invention.
FIG. 3 is a view of the drive element as depicted in FIG. 1.
Figures 2, 4:
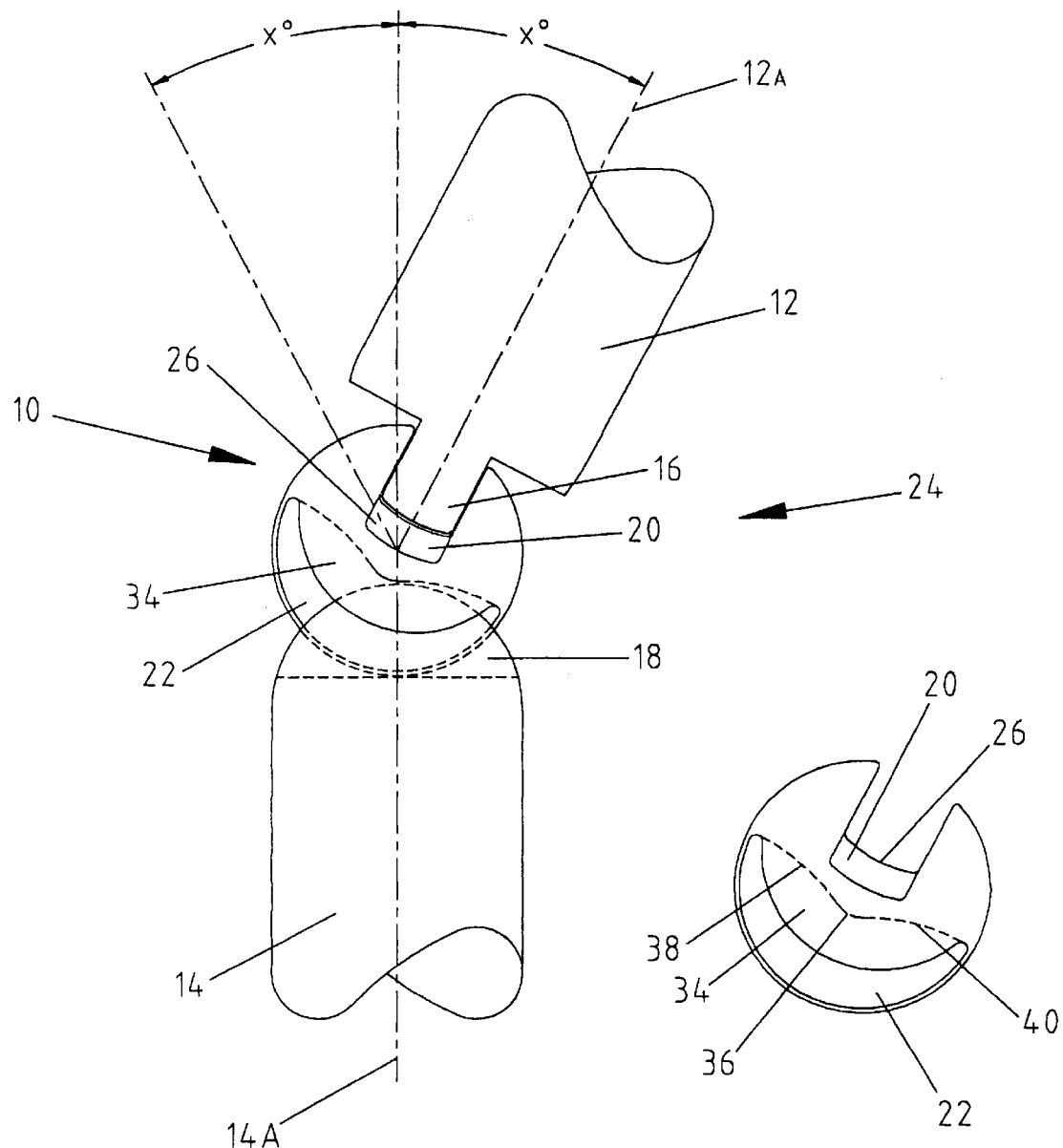
FIG. 2 is a side view of the coupling shown in FIG. 1 but with all the components having been rotated 90°.
FIG. 4 is a view of the drive element as depicted in FIG. 2.

As shown in the accompanying drawings a drive element 10 is provided for coupling together first and second rotatable members in the form of shafts 12 and 14. Shaft 12 is able to rotate about its longitudinal axis 12A while shaft 14 is able to rotate along its longitudinal axis 14A. The shafts 12 and 14 are able to pivot relative to each other about a pivot point P which is located at the intersection point of axis 12A and 14A when those axes are not in line. The drive element 10 is located between the shafts 12 and 14 with its geometric centre coincident with the pivot point P. End of shaft 12 adjacent the drive element 10 is provided with a projection or tongue 16, and end of shaft 14 adjacent the drive element 10 is provided with a slot or groove 18. In order for the drive element 10 to couple the shafts 12 and 14 together it is provided with a first coupling means in the form of a groove 20 for receiving the tongue 16 and a projection or tongue 22 which is seated in the slot 18.

When, for example, shaft 14 is driven to rotate about its axis 14A, torque is transmitted by drive element 10 to shaft 12 causing it to rotate about its axis 12A in the same direction of rotation of the shaft 14.

Together the shafts 12 and 14 and drive element 10 form a universal coupling 24. The pivoting of shaft 12 is in a plane which is coincident with the length of the slot 20. Shaft 14 is able to pivot in a transverse plane which is coincident with the plane containing the projection 22. In order to allow the shafts 12 and 14 to pivot relative to each other about pivot point P without changing the overall length of the universal coupling 24 the drive element 10 is configured to maintain a substantially constant spacing between the pivot point P and the respective loci of closest contact of the shafts 12 and 14 with the geometric centre P of the drive element 10 for a predetermined range of angles of pivot of the axis 12A and 14A relative to each other.

Figure 5:
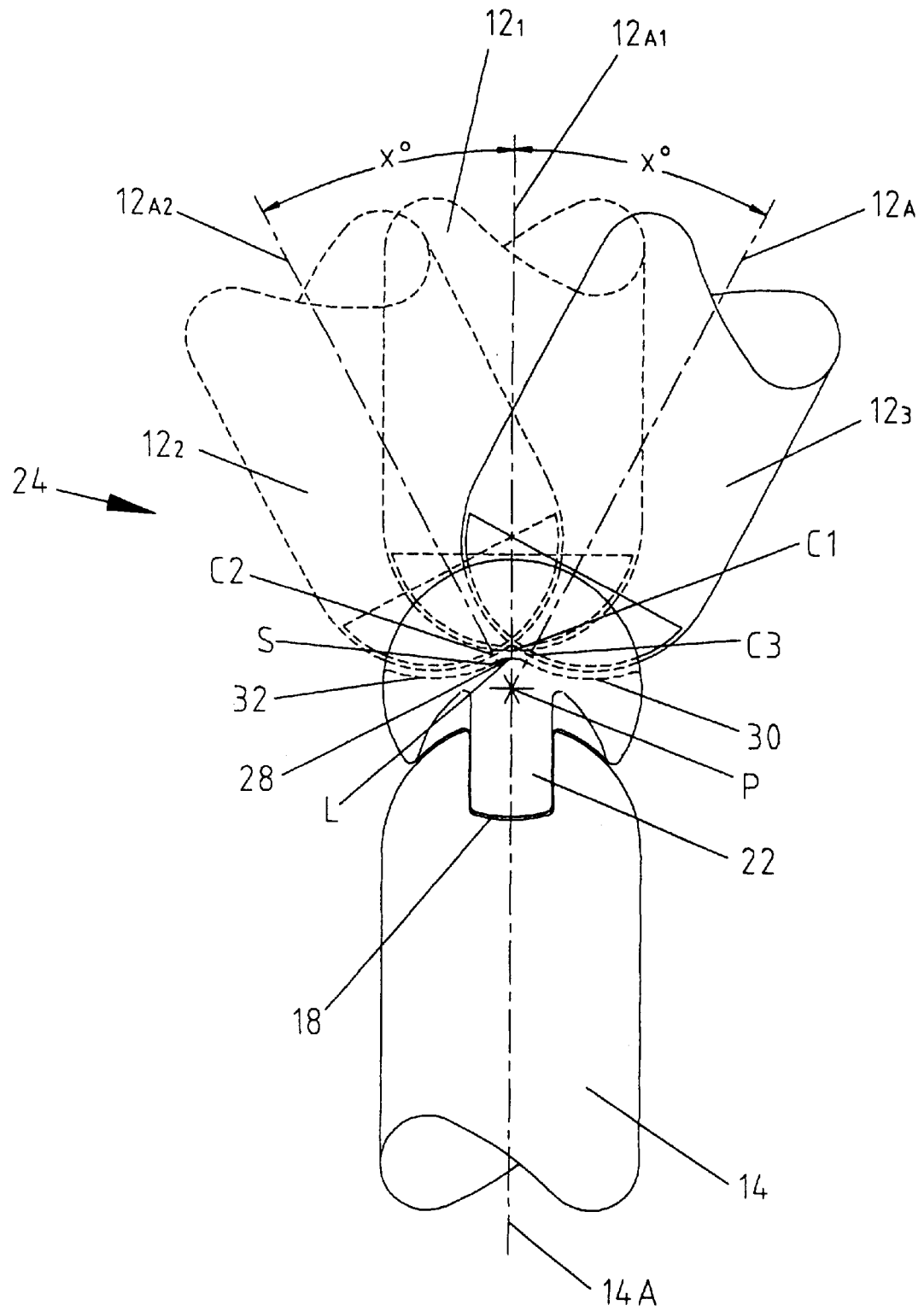
FIG. 5 is a side view of the coupling as depicted in FIG. 1 but with the output shaft shown in a range of various inclinations.

The loci of closest contact are best illustrated in FIG. 5. This Figure illustrates the coupling 24 at a central position and two opposite pivoted positions. In the central position the shaft $12_1$ has its axis of rotation $12_{A1}$ co-linear with the axis 14A. Pivoting the shaft 12 through an angle α in an anticlockwise direction leaves the shaft in a position shown by phantom shaft $12_2$. Pivoting the shaft 12 from the central position in a clockwise direction places it at the position indicated by shaft $12_3$. The point of closest contact of the shaft 12 in positions $12_3$, $12_2$ and $12_3$ indicated as contact points $C_1$, $C_2$, and $C_3$ respectively. As the shaft is pivoted between positions $12_3$ and $12_2$ the points of closest contact C define a locus L of closest contact (ie. shortest distance) between the shaft 12 and the geometric centre P. The overall length of the universal coupling 24 can be kept substantially constant for a range of pivot angles plus or minus α of pivot axis 12A relative to pivot axis 14A by ensuring that all points along locus L remain the same distance from pivot point P. This is achieved by relieving or otherwise shaping the surface 26 of the element 10 at the root of the slot 20 in opposite directions from the midway point of the length of the slot 20. The surface 26 is relieved to have a compound shape comprising a central convex surface portion 28 and two opposite concave surface portions 30 and 32 (ref FIG. 3). The central convex surface portion 28 is of a shape or profile coincident with the locus L. The surface portions 28, 32 and 30 are continuously and smoothly formed. The concave surface portions 30 and 32 accommodate portions of the shaft 12 when in the pivoted positions $12_2$ and $12_3$ respectively.

It will be appreciated that if the surface 26 were planar then pivoting of the shaft 12 to positions $12_2$ or $12_3$ would be accompanied by a linear translation of the shaft 12 away from the geometric centre P because a shaft would be levered outwardly against the planar surface.

The surface 34 of the element 10 on opposite sides of tongue 22 is relieved or otherwise shaped in a manner similar to surface 26 so that as the shaft 14 is pivoted through plus and minus α° from a central line at which axes 14A and 12A are coincident, the distance from a locus of closest contact of the shaft 14 to the pivot point P remains constant, The surface 34 on opposite sides of the projection 22 comprises a central convex portion 36 and contiguous concave portions 38 and 40 on opposite sides thereof. The convex portion 36 is of a shape or profile corresponding to a locus of constant distance between the point of closest contact of shaft 14 and the geometric centre P for the shaft 14 pivoting between plus and minus α° from its central position.

By appropriate machining or relieving of the surfaces 26 and 34 the axes of rotation 12A and 14A can be pivoted from the central position by approximately 25° to 30° in opposite directions without effecting the total length of the coupling 24. Thus, one single element 10 can provide a universal coupling in which one shaft can pivot in a cone of 50° to 60°.

As the slot 20 and projection 22 are in mutually orthogonal planes, the drive 10 is in fact restrained to rotate about the pivot point P by the shafts 12 and 14. Thus, there is no need for bearings or other devices to be provided in order to hold the drive element 10 in place. This minimises power loss through friction. Nevertheless, it is envisaged that in practice perhaps a locating ring (made from a self lubricating material eg. nylon) or bearing may be provided with a running clearance about the drive element 10. In heavy load and/or high RMP application it is recommended that a bearing be used.

Figure 7:
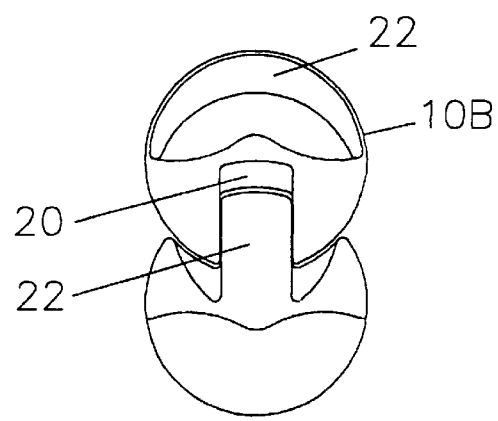
FIG. 7 is an enlarged view of two of the drive elements of the articulated flexible drive shown in FIG. 6.
Figure 6:
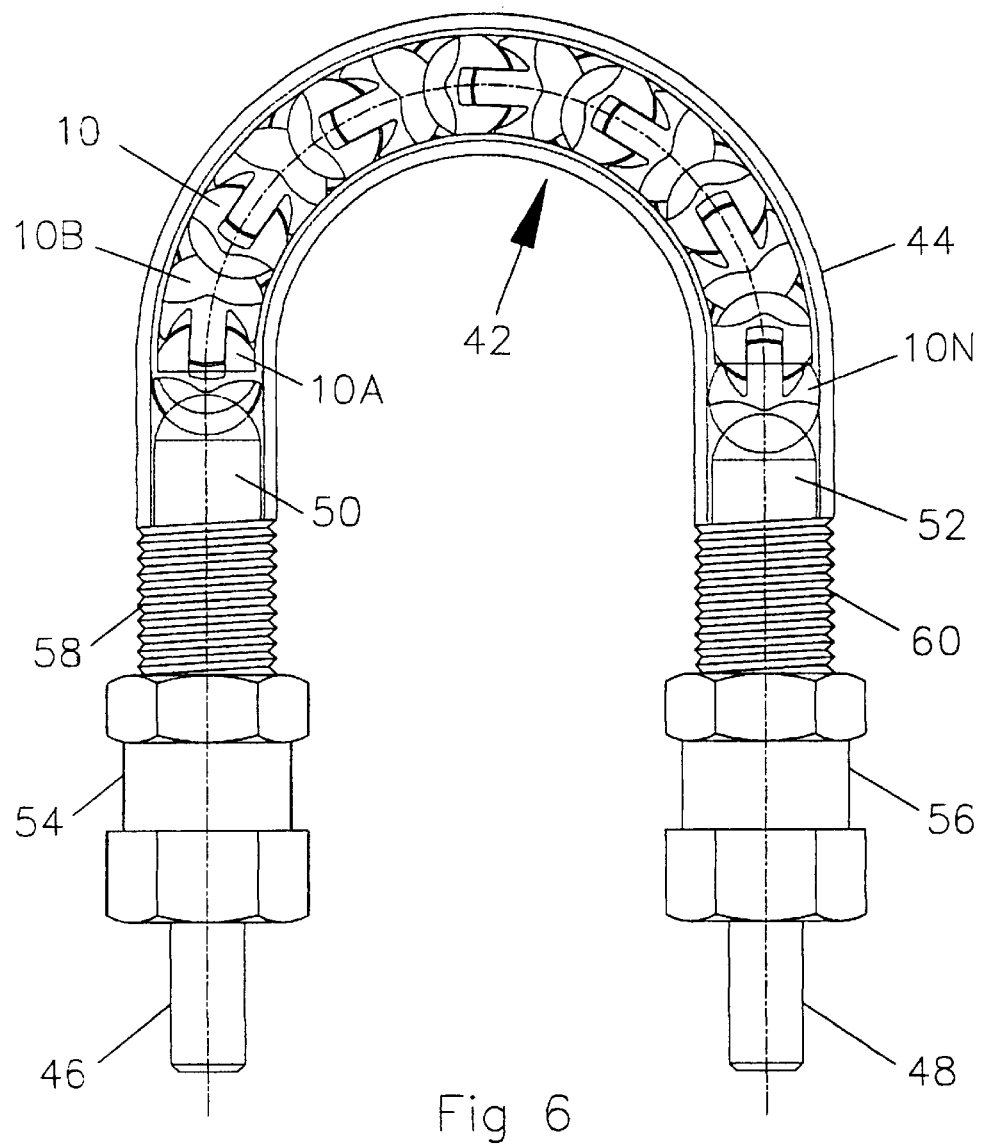
FIG. 6 is a partial sectional view of an articulated flexible drive incorporating the drive element.

In another embodiment of this invention, shown in FIGS. 6 and 7, a flexible articulated drive 42 is formed by intermeshing a number of drive elements 10 within a flexible housing, such as a tube 44, and providing torque input and torque output shafts 46 and 48 respectively at each end of the tube 44. In this embodiment, a first one of the drive elements 10A meshes with a tongue 50 of the torque input shaft 10A and a last one of the drive element 10N meshz with a tongue 52 of the torque output shaft 48. Because each drive element 10 is able to pivot relative to an adjacent drive element by approximately 25 to 30° without a change in the spacing therebetween, the flexible tubing can be curved or otherwise contorted about fixed, variable, and for multiple radii without causing any substantial change in spacing between the opposite end elements. For greatest efficiency it is envisaged that the flexible articulated drive 42 may still include a biasing element or other means at one or both ends for fine adjustment of the clearance between drive elements 10. The torque input and output shafts 46, 48 are rotably retained in respective bushes 54 and 56 which are screwed onto threads 58 and 60 provided at opposite ends of the tube 44. The intermeshing of two of the drive elements 10A and 10B in the tube 42 is mostly clearly shown in FIG. 7. The drive elements 10A and 10B and indeed all of the elements 10 are of identical shape, configuration and operation as the elements shown in FIGS. 1–5. The projection 22 of element 10A is received in slot 20 of element 10B, The elements 10A and 10B can pivot relative to each other without the spacing therebetween for a predetermined range of pivot angles in an analogues manner as described above in relation to the embodiments of FIGS. 1–5. When the elements are rotating they can also slide relative to each other in directions transverse to their axes of rotation due to the inherent nature of the projection in slot meshing. This sliding motion is in the planes which contain the slots 20 and projections 22 of the adjacent intermeshing elements 10. This gives rise to an oscillatory motion of the element 10 when torque is transferred from input shaft 46 to output shaft 48.

Now that an embodiment of the present invention has been described in detail it will be apparent to those skilled in the relevant arts that numerous modifications and variations may be made without departing from the basic inventive concepts. For example, the drive element 10 is shown as comprising a slot 20 and projection 22. However, depending on the nature of the member coupled to the drive element 10 the drive element 10 may comprise either two projections 22 or two slots 20 in mutually orthogonal planes. It is also believed that the element 10 need not necessarily be of a generally spherical shape. Also, the drive element 10 may either be solid (for example be formed by die casting or by the machining of a solid sphere of material) or alternately be hollow.

All such modifications and variations are deemed to be within the scope of the present invention the nature of which is to be determined from the foregoing description.

The claims defining the invention are as follows:

1. A drive element for coupling together first and second rotatable members having respective axes of rotation which can pivot relative to each other about a pivot point located at the geometric centre of the drive element, the drive element having first and second coupling means for coupling with the first and second rotatable members respectively, and configured to maintain a substantially constant spacing between the pivot point and respective loci of closest contact of the first and second rotatable members with the geometric centre of the drive member for a predetermined range of angles of pivot of said axes relative to each other.

2. A drive element according to claim 1 wherein, the first coupling means is in the form of a projection for engaging with a slot formed on the first rotatable member, and wherein a length of the surface of the first coupling means adjacent the root of the projection, extending from the midpoint of the root of the projection in opposite directions is shaped to coincide with the locus of closest contact of the first member and first coupling means.

3. A drive element according to claim 2 wherein, the second coupling means is in the form of a slot for engaging with a projection formed on the second rotatable member, and wherein a length of the surface of the second coupling means adjacent the root of the slot extending from the midpoint of the root of the slot in opposite directions is shaped to coincide with the locus of closest contact of the second member and the second coupling means.

4. A drive element according to claim 3, wherein the first and second coupling means extend in mutually perpendicular directions to each other.

5. A drive element according to claim 1, wherein the first coupling means is formed as one of a projection and a slot, and the second coupling means is formed as the other of the projection and slot.

6. A drive element according to claim 1, wherein both the first coupling means and second coupling means are in the form of a projection or a slot.

7. A drive element according to claim 1, wherein the drive element is in the form of a sphere with material removed therefrom to produce said first and second coupling means.

8. A drive element according to claim 1, wherein the predetermined range of angles is in the order of up to 50° to 60°.

9. An articulated coupling comprising:
a first shaft rotatable about its longitudinal axis;
a second shaft rotatable about its longitudinal axis; and,
a drive element located between and coupled to the first and second shafts for transmitting torque from one of the shafts to the other shaft in a clockwise or anticlockwise direction, the drive element provided with first and second coupling means for coupling with the first and second rotatable shafts respectively, the first and second coupling means adapted to allow the first and second shafts to pivot relative to each other about a pivot point coincident with the geometric centre of the drive element, the drive element further configured so as to maintain a substantially constant distance between the pivot point and the respective loci of closest contact of the first and second rotatable shafts with the geometric centre of drive element for a predetermined range of angles of pivot of the axes relative to each other so that the total length of the articulated coupling remains substantially constant over the predetermined range of angles of pivot of the axes relative to each other.

10. A coupling according to claim 9, wherein the first coupling means is in the form of a projection for engaging with a slot formed on the first rotatable shaft, and wherein a length of the surface of the first coupling means adjacent the root of the projection extending from the midpoint of the root of the projection in opposite directions is shaped to coincide with the locus of closest contact of the first shaft and first coupling means.

11. A coupling according to claim 10, wherein the second coupling means is in the form of a slot for engaging with a projection formed on the second rotatable shaft, and wherein a length of the surface of the second coupling means adjacent the root of the slot extending from the midpoint of the root of the slot in opposite directions is shaped to coincide with the locus of closest contact of the second shaft and the second coupling means.

12. A coupling according to claim 11, wherein the first and second coupling means extend in mutually perpendicular directions to each other.

13. A coupling according to claim 9, wherein the first coupling means is formed as one of a projection and a slot, and the second coupling means is formed as the other of the projection and slot.

14. A coupling according to claim 9, wherein the drive element is in the form of a sphere with material removed therefrom to produce said first and second coupling means.

15. A coupling according to claim 9, wherein the predetermined range of angles is in the order of up to 60°.

16. An articulated flexible drive for transmitting torque along a drive line in both clockwise and anticlockwise directions, said articulated flexible drive comprising a plurality of drive elements and a flexible housing for rotatably retaining the drive elements along the drive line, the drive elements being rotatable about respective rotation axes tangent to the drive line and each having first and second coupling means to facilitate intermeshing of adjacent drive elements in the manner so that adjacent drive elements can slide relative to each other in planes containing the first and second coupling means of adjacent intermeshing drive elements, the first and second coupling means further configured so as to maintain substantially constant spacing between the geometric centres of adjacent drive elements for a locus of closest contact of the adjacent drive elements for a predetermined range of angles of pivot of the respective axes of rotation relative to each other.

17. An articulated flexible drive according to claim 16, wherein the first coupling means is in the form of a projection and the second coupling means is in the form of a slot, and wherein a length of the surface of each drive element adjacent the root of the slot and projection extending from the midpoint of the root of projection or slot in opposite directions is shaped to coincide with the locus of closest contact between adjacent drive elements.

18. An articulated flexible drive according to claim 17, wherein the slot and projection on each drive element extend in mutually perpendicular directions to each other.

19. An articulated flexible drive according to claim 17, wherein each drive element is in the form of a sphere with the material removed therefrom to produce the first and second coupling means.

20. An articulated flexible drive according to claim 17, wherein the predetermined range of angles is in the order of up to 60°.

21. A drive element for coupling together first and second rotatable members having respective axes of rotation which can pivot relative to each other about a pivot point located at the geometric centre of the drive element, the drive element having first and second coupling means for coupling with the first and second rotatable members respectively, the first coupling element being in the form of a projection and a second coupling element being in the form of a slot, a length of the surface of the first coupling means adjacent the root of the projection extending from the mid point of the root of the projection in opposite directions being shaped to coincide with the locus of closest contact of the first member and the first coupling means;

a length of the surface of the second coupling means adjacent the root of the slot extending from the mid point of the root of the slot in opposite directions being shaped to coincide with the locus of closest contact of the second member and the second coupling means;

whereby substantial constant spacing is maintained between the pivot point and respective loci of closest contact of the first and second rotatable members with the geometric centre of the drive member for a predetermined range of angles of pivot of said axes relative to each other.

22. A drive element according to claim 21, wherein the first and second coupling means extend in mutually perpendicular directions to each other.

23. A drive element according to claim 22, wherein the drive element is in the form of a sphere with material removed therefrom to produce the first and second coupling means.

24. A drive element according to claim 21, wherein the predetermined range of angles is in the order of up to 60°.

25. An articulated coupling comprising:

a first shaft rotatable about its longitudinal axis;

a second shaft rotatable about its longitudinal axis; and, a drive element located between and coupled to the first and second shafts for transmitting torque from one shaft to the other shaft in a clockwise or anticlockwise direction, the drive element provided with first and second coupling means for coupling with the first and second rotatable shafts respectively, the first and second shafts being able to pivot relative to each other about a pivot point coincident with the geometric centre of the drive element, the first coupling means being in the form of a projection and the second coupling means being in the form of a slot, a length of the surface of the first coupling means adjacent the root of the projection extending from the midpoint of the root of the projection in opposite directions, being shaped to coincide with the locus of closest contact of the first shaft and the first coupling means;

a length of the surface of the second coupling means adjacent the root of the slot, extending from the mid point of the root of the slot in opposite directions, being shaped to coincide with the locus of closest contact of the second shaft with the second coupling means;

whereby substantially constant spacing is maintained between the pivot point and respective loci of closest contact of the first and second shafts with the geometric centre of the drive element for a predetermined range of angles of pivot of said shafts relative to said pivot point.

26. An articulated flexible drive for transmitting torque along a drive line in both clockwise and anticlockwise directions, said articulated flexible drive comprising a plurality of drive elements and a flexible housing for rotatably retaining the drive elements along the drive line, the drive elements being rotatable about respective rotation axis tangent to the drive line and each having a slot and a projection for facilitating intermeshing of adjacent drive elements in the manner so that adjacent drive elements can slide relative to each other in planes containing the slot and projection of adjacent intermeshing drive elements, the slot and projection of each drive means further configured so as to maintain substantially constant spacing between the geometric centres of adjacent drive elements for a locus of closest contact of adjacent drive elements for a predetermined range of angles of pivot of the respective axis of rotation relative to each other.

27. An articulated flexible drive according to claim 26 where each drive element is in the form of a sphere with material removed therefrom to produce said slot and projection.

* * * * *